(12) United States Patent
Popov

(10) Patent No.: US 9,189,833 B2
(45) Date of Patent: Nov. 17, 2015

(54) LINEAR TRANSFORM-BASED IMAGE PROCESSING TECHNIQUES

(71) Applicant: Apple Inc., Cupertino, CA (US)

(72) Inventor: Roumen N. Popov, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 13/741,655

(22) Filed: Jan. 15, 2013

(65) Prior Publication Data

US 2014/0198992 A1    Jul. 17, 2014

(51) Int. Cl.
*G06T 5/00* (2006.01)

(52) U.S. Cl.
CPC ....... *G06T 5/002* (2013.01); *G06T 2207/20064* (2013.01)

(58) Field of Classification Search
CPC ............ G06K 9/4609; G06K 9/00791; G06T 2207/20192; G06T 1/00; G06T 5/003; G06T 5/008; G06T 5/20; G06T 5/002; G06T 5/001; G06T 5/50; G06T 7/2066; H04N 1/58; H04N 5/357

See application file for complete search history.

(56) References Cited

U.S. PATENT DOCUMENTS

| 6,766,062 | B1 * | 7/2004 | Donoho et al. ............... 382/240 |
| 6,771,793 | B1 * | 8/2004 | Yamada ......................... 382/264 |
| 6,801,672 | B1 * | 10/2004 | Thomas ......................... 382/275 |
| 7,515,763 | B1 * | 4/2009 | Zhong ............................ 382/254 |
| 8,059,905 | B1 * | 11/2011 | Christian ...................... 382/254 |
| 2004/0066850 | A1 * | 4/2004 | Nakajima et al. ........ 375/240.19 |
| 2005/0265629 | A1 * | 12/2005 | Fu et al. .......................... 382/275 |
| 2011/0268368 | A1 * | 11/2011 | Toyoda et al. ................ 382/264 |
| 2013/0243279 | A1 * | 9/2013 | Zhang et al. .................. 382/128 |

OTHER PUBLICATIONS

Azaria, M., Vitsnudel, I., and Zeevi, Y.Y., "The design of two-dimensional gradient estimators based on one-dimensional operators," IEEE Transactions on Image Processing, vol. 5, No. 1, pp. 155-159, Jan. 1996.

Westen, S.J.P., Lagendijk, R.L., and Biemond, J., "Adaptive spatial noise shaping for DCT based image compression," 1996 IEEE International Conference on Acoustics, Speech, and Signal Processing. Conference Proceedings, vol. 4, pp. 2124-2127, May 7-10, 1996.

Bolcskei, H., and Hlawatsch, F., "Oversampled filter banks: optimal noise shaping, design freedom, and noise analysis," 1997 IEEE International Conference on Acoustics, Speech, and Signal Processing, vol. 3, pp. 2453-2456, Apr. 21-24, 1997.

(Continued)

*Primary Examiner* — Jingge Wu
(74) *Attorney, Agent, or Firm* — Blank Rome LLP

(57) ABSTRACT

Signal processing techniques utilize operations performed in linear transform domains to perform operations including noise reduction, noise shaping, and gradient integration. The standard wavelet shrinkage method may be altered to constrain the modification of wavelet coefficients towards an initial estimate of the adjusted coefficients. The initial estimates can be computed by applying an edge detection filter to an input image. The wavelet shrinkage method may additionally be altered to include a noise preservation factor that enables an amount of noise to be preserved to avoid the production of artifacts. Integration of modified multi-dimensional gradients may also be performed in the wavelet (or other linear transform) domain by performing simple integration of the gradient (summing) separately in each dimension, obtaining a linear transform representation of the resulting signals, and combining the linear transforms.

19 Claims, 13 Drawing Sheets

(56) References Cited

OTHER PUBLICATIONS

Shyh-Shiaw Kuo, and Johnston, J.D., "Spatial noise shaping based on human visual sensitivity and its application to image coding," IEEE Transactions on Image Processing, vol. 11, No. 5, pp. 509-517, May 2002.

Reeves, T.H., and Kingsbury, N.G., "Overcomplete image coding using iterative projection-based noise shaping," 2002 International Conference on Image Processing, vol. 3, pp. 597- 600, Jun. 24-28, 2002.

Min Dai, Cheng Peng, Chan, A.K., and Loguinov, D., "Bayesian wavelet shrinkage with edge detection for SAR image despeckling," IEEE Transactions on Geoscience and Remote Sensing, vol. 42, No. 8, pp. 1642-1648, Aug. 2004.

Xiao-Wei Zhang, Lei Zhu, and Xiong-Bo Zheng, "Study to the image denoising algorithm based on multiwavelet transforms," International Conference on Wavelet Analysis and Pattern Recognition, 2007, vol. 4, pp. 1803-1807, Nov. 2-4, 2007.

Hampton, P.J., and Agathoklis, P., "Comparison of Haar wavelet-based and Poisson-based numerical integration techniques," Proceedings of 2010 IEEE International Symposium on Circuits and Systems (ISCAS), pp. 1623-1626, May 30, 2010-Jun. 2, 2010.

Crouse, M.S., Baraniuk, R.G., and Nowak, R.D., "Hidden Markov models for wavelet-based signal processing," Conference Record of the Thirtieth Asilomar Conference on Signals, Systems and Computers, 1996, vol. 2, pp. 1029-1035, Nov. 3-6, 1996.

Rong Bai, "Wavelet Shrinkage Based Image Denoising using Soft Computing" a thesis presented to the University of Waterloo in fulfillment of the thesis requirement for the degree of Master of Applied Science in Systems Design Engineering, Waterloo, Ontario, Canada, 2008 (117 pages).

Yong Yue, Croitoru, M.M., Bidani, A., Zwischenberger, J.B., and Clark, J.W., Jr., "Nonlinear multiscale wavelet diffusion for speckle suppression and edge enhancement in ultrasound images," IEEE Transactions on Medical Imaging, vol. 25, No. 3, pp. 297-311, Mar. 2006.

Perez, P., Gangnet, M., and Blake, A., "Poisson Image Editing," ACM Transactions on Graphics (TOG)—Proceedings of ACM SIGGRAPH 2003, vol. 22, iss. 3, pp. 313-318, Jul. 2003.

Donoho, D., "Nonlinear Wavelet Methods for Recovery of Signals, Densities, and Spectra from Indirect and Noisy Data," Proceedings of Symposia in Applied Mathematics, vol. 00, pp. 173-204, 1993.

Sendur, L, Selesnick, I.W., "Bivariate shrinkage functions for wavelet-based denoising exploiting interscale dependency," IEEE Transactions on Signal Processing, vol. 50, No. 11, pp. 2744-2756, Nov. 2002.

\* cited by examiner

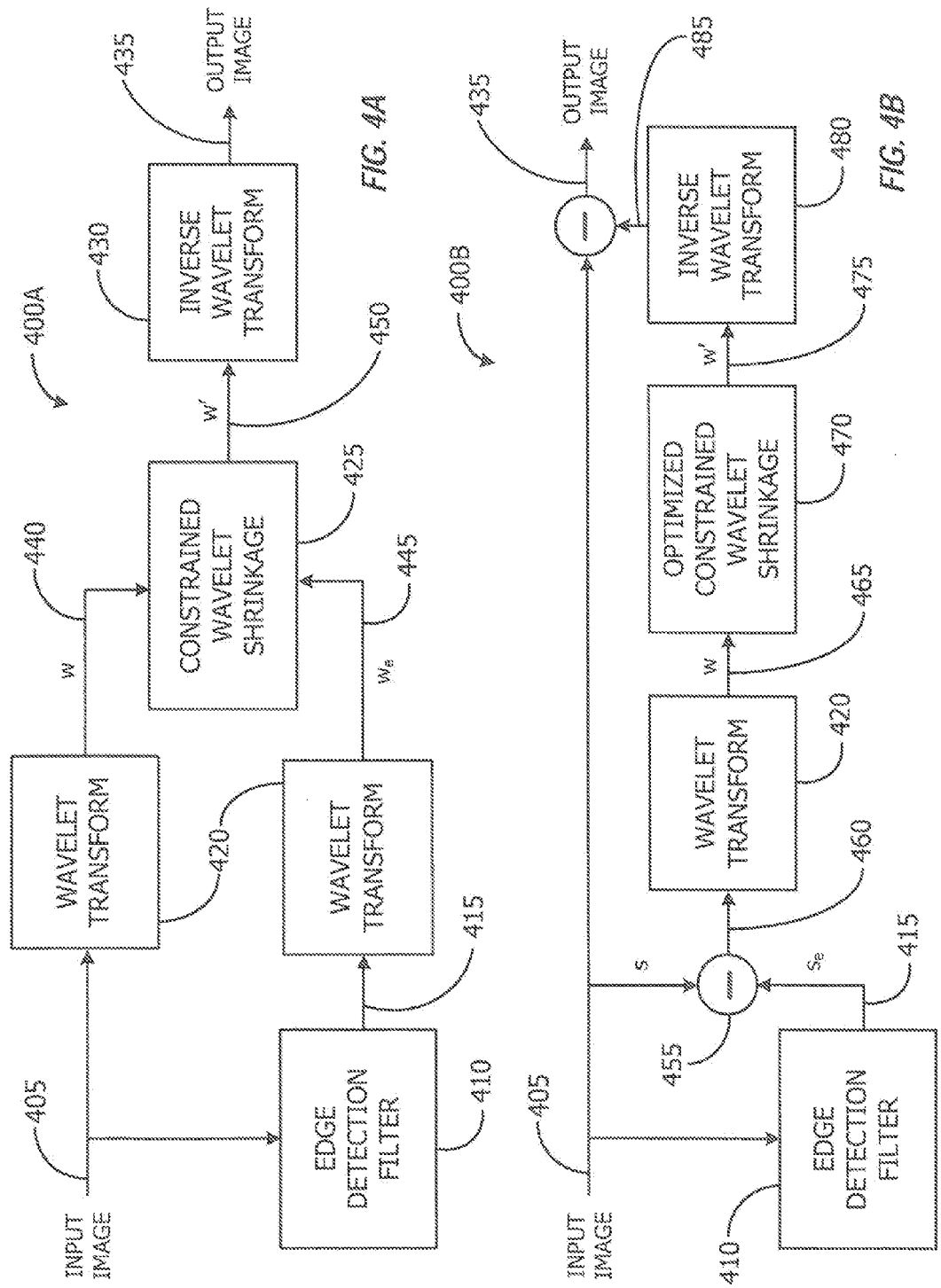

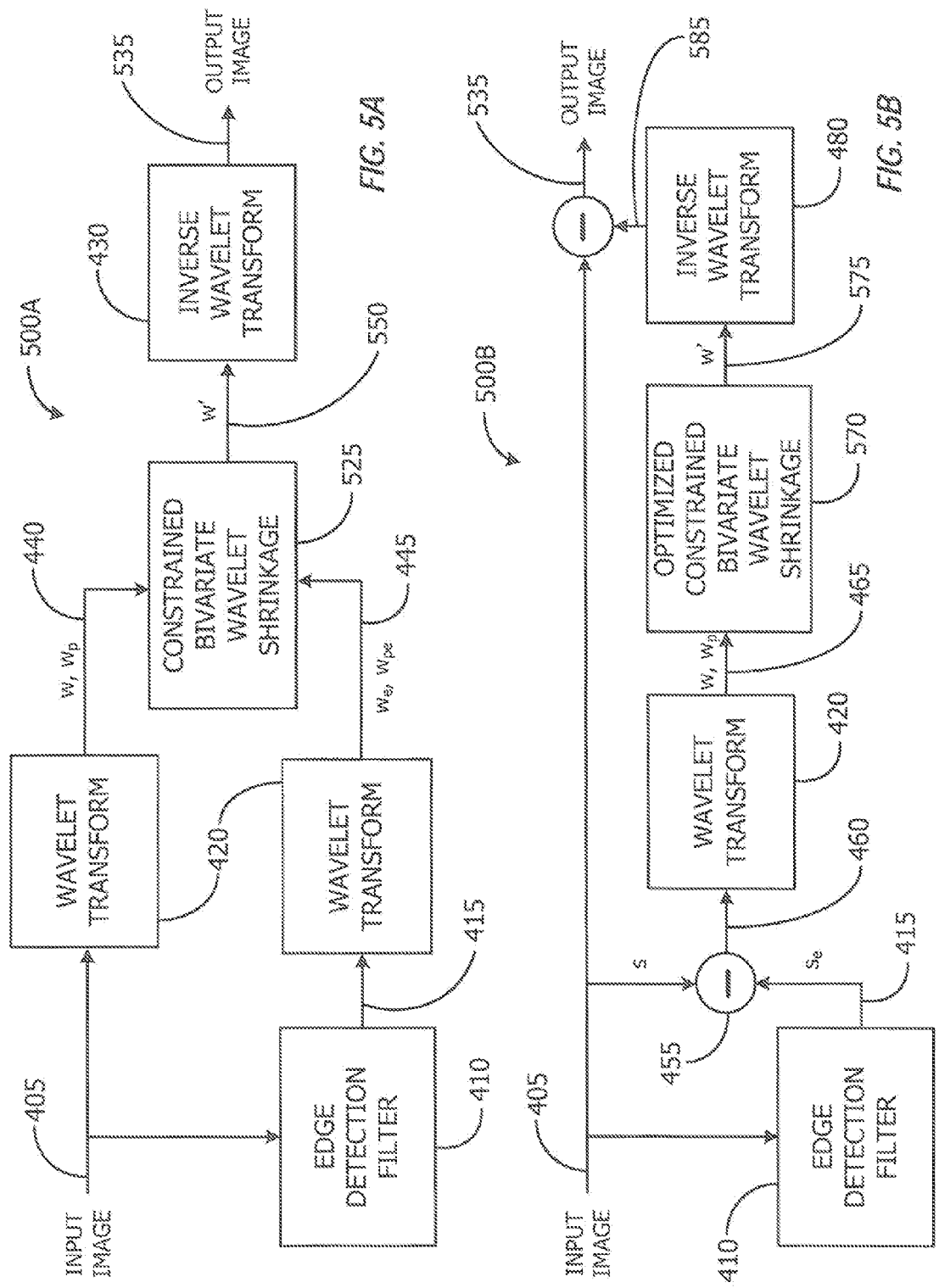

LINEAR TRANSFORM-BASED IMAGE PROCESSING TECHNIQUES

BACKGROUND

This disclosure relates generally to signal processing using linear transforms. More particularly, the disclosure relates to techniques for noise reduction, noise shaping, and gradient-based image processing in the linear transform domain.

Wavelet transforms provide a useful tool for various forms of signal processing. For example, wavelet transforms can be used for digital file compression and to perform correction operations such as noise reduction. Referring to FIG. 1, application of the Haar wavelet transform to a simple eight point signal 105 demonstrates the basic concepts of wavelet transforms. At each stage, the Haar transform converts an input signal into two sets of signals by applying a low-pass filter and a high-pass filter. For the Haar transform illustrated in FIG. 1, application of the low-pass filter results in an output signal that includes the averages of adjacent signal pairs $$\left(\text{e.g.,}\ \frac{f(0)+f(1)}{2},\ \frac{f(2)+f(3)}{2},\ \dots\right)$$

and application of the high-pass filter results in an output signal that includes the differences between adjacent signal pairs $$\left(\text{e.g.,}\ \frac{f(0)-f(1)}{2},\ \frac{f(2)-f(3)}{2},\ \dots\right).$$

By feeding the low-pass filter output signal through consecutive stages of the transform, a hierarchical representation (i.e., a wavelet pyramid representation) of the initial input signal can be obtained. The wavelet pyramid has N+1 scales where N is equal to the number of stages of the transform. Processing eight point signal 105 through three stages of the Haar transform results in a four scale pyramid having signals of lengths 4, 2, 1, and 1 (i.e., H1=⟨−1, −0.5, −0.5, 0.5⟩, H2=⟨−0.25, 1⟩, H3=⟨=1.125⟩, L3=⟨4.375⟩). The output of the low-pass filter at the coarsest scale is the low-pass residual and represents its own scale of the wavelet pyramid. It will be understood that this wavelet representation is invertible in that it can be used to recover input signal 105. That is, performance of an inverse wavelet transform re-creates an input signal from its wavelet representation. Although FIG. 1 has been described with reference to the Haar wavelet transform, the techniques disclosed in this specification are applicable to any invertible linear transform such as other types of wavelet transforms, curvelet transforms, dual tree complex wavelet transforms, ridgelet transforms, etc.

FIG. 2 illustrates a popular approach to signal noise reduction. Application of a multi-stage wavelet transform to input signal 205 may generate a four-scale wavelet representation of signal 205 where the magnitude of the wavelet coefficients at each of scales 215A/B/C/D is illustrated by vertical bars. It should be noted that the illustrated wavelet representation is intended to demonstrate a common noise reduction technique and not to depict an accurate wavelet representation of input signal 205 using any particular wavelet transform. The multi-stage wavelet transform applied to input signal 205 results in a "clean" wavelet representation of the input signal. That is, for portions of input signal 205 that are substantially constant, the wavelet transform results in wavelet coefficients that are near zero in value. This is precisely the property that makes wavelet transforms valuable for data compression. However, application of the same multi-scale transform to input signal 210 (a noisy version of input signal 205), results in a "noisy" wavelet representation. A comparison of corresponding portions 225 and 230 of the wavelet representations of signals 205 and 210 illustrates that the noise in signal 210 results in small magnitude wavelet coefficients that substantially represent noise in addition to large magnitude wavelet coefficients that substantially represent signal. The wavelet shrinkage operation reduces the magnitude of or eliminates wavelet coefficients within a particular range (e.g., within range 235) and leaves unmodified wavelet coefficients outside of the range such that, upon performance of an inverse wavelet transform, a cleaner version of the input signal is generated. For example, application of the wavelet shrinkage operation on the wavelet representation of signal 210 would result in a wavelet representation that more closely approximates the wavelet representation of signal 205, and, thus, a signal that more closely approximates signal 205 upon performance of an inverse wavelet transform.

Although the wavelet shrinkage operation effectively reduces signal noise, it also alters the magnitude relation between wavelet coefficients at different scales and the same spatial location, which results in the production of undesirable artifacts around strong edges. Various solutions exist to reduce the prominence of these undesirable artifacts. For example, bivariate wavelet shrinkage limits the amount of modification applied to wavelet coefficients around strong edges by reducing the amount of modification applied to a wavelet coefficient if a corresponding parent coefficient from one scale up the wavelet pyramid has a large magnitude (which implies the presence of a strong edge). An improvement over the bivariate wavelet shrinkage operation is to use Hidden Markov Models to explicitly model the probability of having an edge at a current spatial location (big magnitudes of wavelet coefficients) versus no edge (small magnitudes of wavelet coefficients). Both operations successfully reduce the magnitude of artifacts around strong edges, but because they limit the amount of modification applied to the wavelet coefficients around edges, the noise reduction is limited in these areas, which results in noticeable noise around edges in the output signal when there is heavier noise in the input signal. Moreover, in the presence of heavy noise, fine noise-like texture (such as skin pores, grass, and foliage) can be completely masked. In such cases, noise reduction also removes the desirable fine texture and results in an output image that looks flat and unnatural. A common solution is to reduce the strength of the noise reductions such that the fine texture is maintained, but this too has its drawbacks. It would therefore be desirable to perform noise reduction and shaping operations in the wavelet domain that reduce or eliminate these issues.

SUMMARY

In one embodiment, an operation is provided to perform signal noise reduction in a linear transform domain. The operation may include applying an invertible linear transform to a signal to obtain a transform representation. One or more components of the transform representation may be adjusted based, at least in part, on an initial estimate of the adjusted components. In one embodiment, the signal may be a digital image and the invertible linear transform may be a wavelet transform. In another embodiment, the signal may be a difference signal calculated based on an input signal and an edge-filtered version of the input signal. The method may be embodied in program code and stored on a non-transitory storage medium. The stored program code may be executed by one or more processors.

In another embodiment, an operation is provided to perform signal noise shaping in a linear transform domain. The operation may include applying an invertible linear transform to a received signal to obtain a transform representation of the received signal. One or more components of the transform representation may be adjusted based, at least in part, on one or more noise preservation factors to obtain a modified transform representation. An inverse transform may be applied to the modified transform representation to obtain an output signal. In one embodiment, the received signal may be a digital image and the invertible linear transform may be a wavelet transform that produces a hierarchical representation with multiple scales. In such an embodiment, the one or more noise preservation factors may be unique to a particular scale or a particular set of components of a particular scale. The operation may be embodied in program code and stored on a non-transitory storage medium. The stored program code may be executed by one or more processors.

In yet another embodiment, an operation is provided to perform various steps of gradient-based image processing techniques in a linear transform domain. The operation may include generating a two-dimensional gradient map of an input image. The two-dimensional gradient map may be modified separately in each dimension according to the desired processing to obtain a first modified gradient map and a second modified gradient map. Components of the modified gradient map may be combined to generate first and second modified outputs (e.g., via a simple integration operation). An invertible linear transform may be applied to signals generated from the first modified output and the second modified output to obtain first and second transform representations, which may be combined to form a single output transform representation. Application of an inverse transform to the output transform representation may result in the generation of an output image (e.g., a modified version of the input image). In one embodiment, the signals generated from the first modified output and the second modified output may be generated by subtracting the first modified output from the input image and subtracting the second modified output from the input image, respectively. The operation may be embodied in program code and stored on a non-transitory storage medium. The stored program code may be executed by one or more processors.

BRIEF DESCRIPTION OF THE DRAWINGS

FIGS. 4A and 4B illustrate noise reduction using constrained wavelet shrinkage in accordance with various embodiments.

FIGS. 5A and 5B illustrate noise reduction using bivariate constrained wavelet shrinkage in accordance with various embodiments.

FIGS. 9A and 9B illustrate gradient-based image processing operations with constrained integration in the wavelet domain in accordance with various embodiments.

Figures 12, 13:
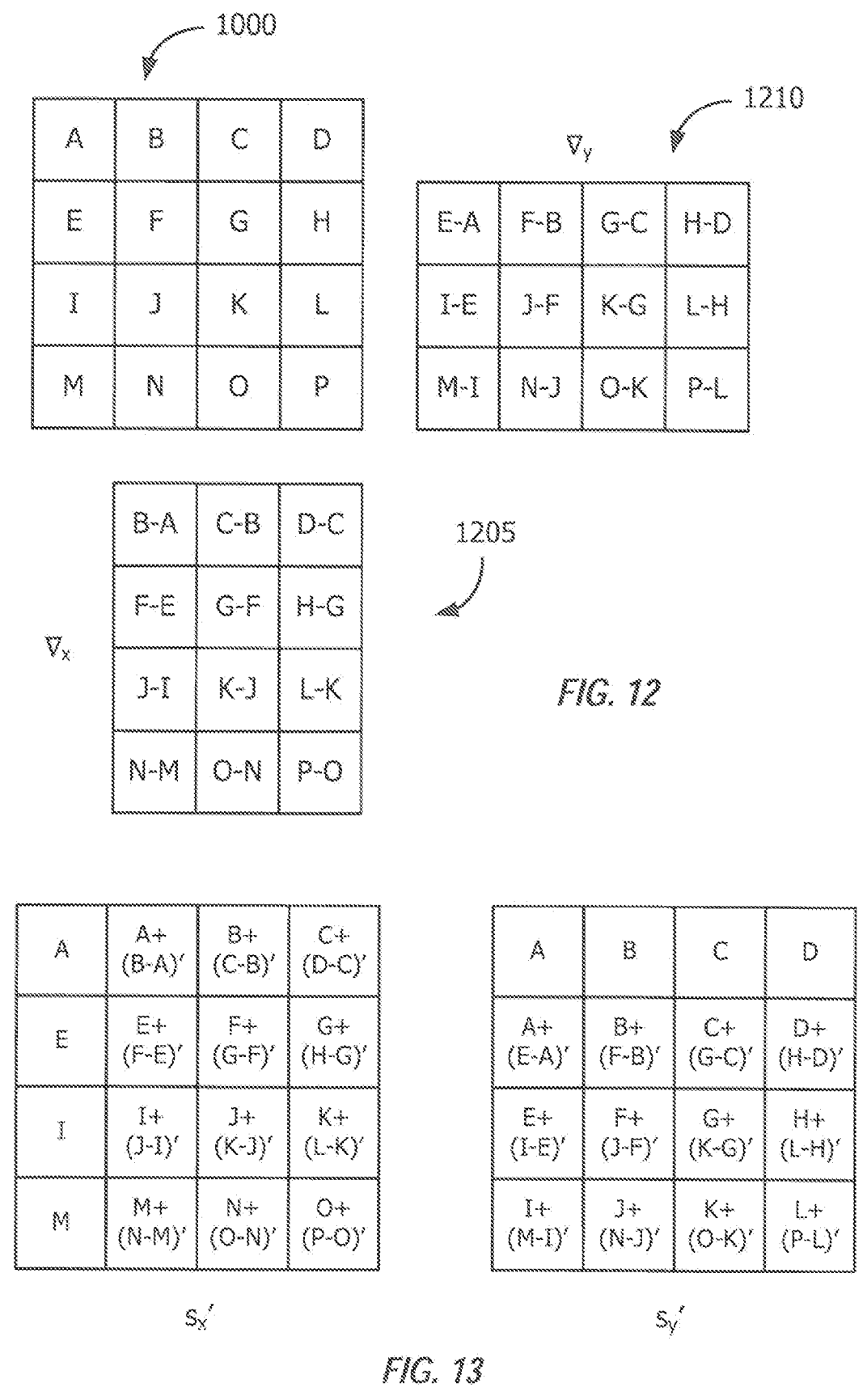

FIGS. 10-12 illustrate two-dimensional gradient calculations in accordance with various embodiments.

FIG. 13 illustrates a simple integration operation performed separately in the horizontal and vertical directions in accordance with one embodiment.

DETAILED DESCRIPTION

This disclosure pertains to systems, methods, and computer readable media for noise reduction, noise shaping, and gradient-based image processing in a linear transform domain. In general, in one embodiment, image noise reduction may be performed in a linear transform domain by adjusting one or more components of a transform representation of a signal based on an initial estimate of the adjusted one or more components. In another embodiment, noise shaping may be performed in the linear transform domain by adjusting one or more components of a transform representation of a signal based on one or more noise preservation factors. In yet another embodiment, the integration operation required for gradient-based image processing may be performed at least partially in a linear transform domain.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of signal processing having the benefit of this disclosure.

Figure 1:
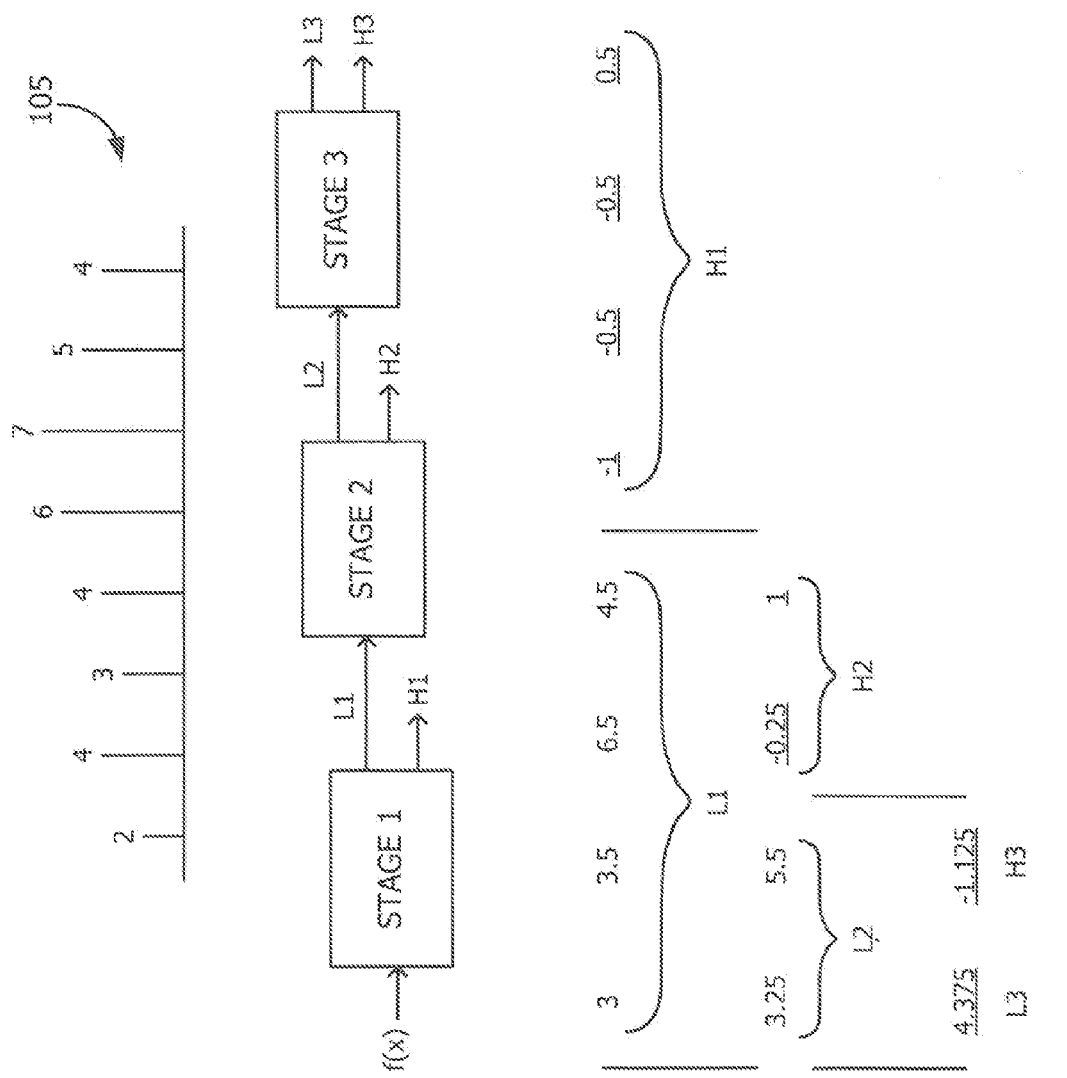
FIG. 1 illustrates application of a multi-stage wavelet transform to an example input signal in accordance with one embodiment.
Figure 2:
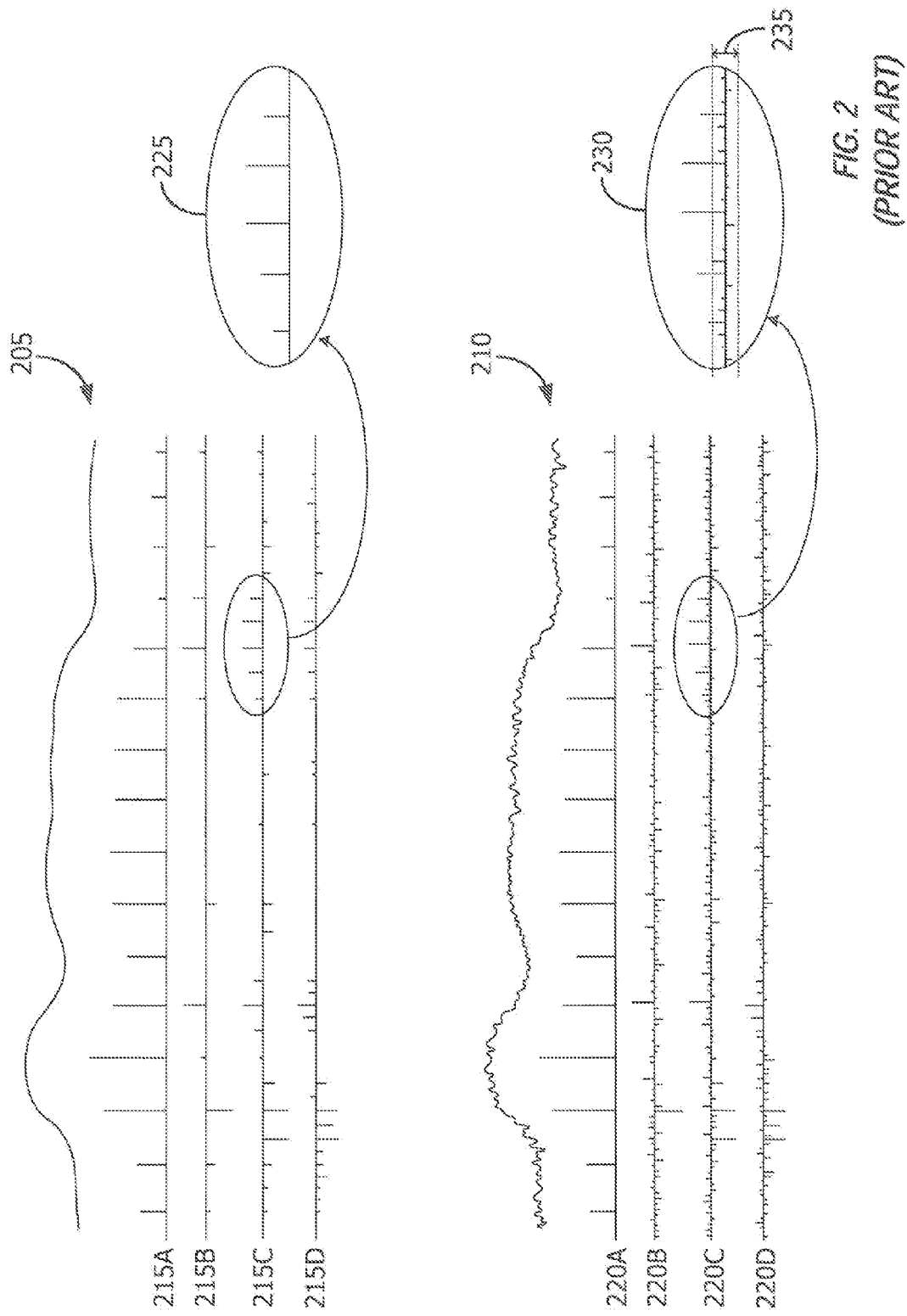
FIG. 2 illustrates a noise reduction operation performed in the wavelet domain in accordance with one embodiment.

For purposes of demonstration, FIGS. 1 and 2 (described above) illustrate one-dimensional wavelet transforms. The operations illustrated in those figures can be expanded to input signals having 2, 3, or more dimensions. For example, signals 105 and/or 205/210 may represent brightness values or values for a particular color channel for a row of pixels in a digital image. Using similar techniques to those illustrated in FIGS. 1 and 2, as is known to those of ordinary skill in the art, a two-dimensional wavelet transform can be applied to pixel rows and columns to generate a wavelet representation of a digital image. The techniques disclosed in the remainder of the specification describe the utilization of wavelet operations in terms of digital image processing (i.e., two-dimensional wavelet transforms). It will be understood, however, that the disclosed techniques are equally applicable to other types of input signals with different dimensionality (e.g., audio (1D) and video (3D) signals) as well as to other types of linear transforms.

Constrained Wavelet Shrinkage for Noise Reduction

Figure 3A:
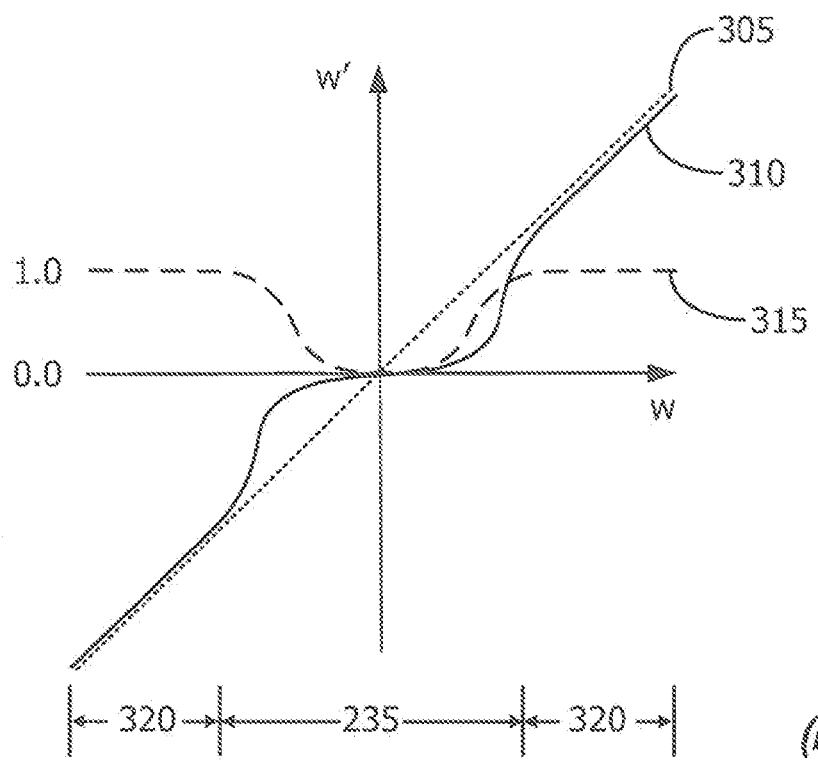
FIGS. 3A and 3B illustrate the modification of wavelet coefficients based on application of a noise reduction function in accordance with various embodiments.

Referring to FIG. 3A, a standard wavelet shrinkage operation may be defined by:

$$w'=w*\text{thr}(|w|), \quad (1)$$

where w represents original wavelet coefficient 305, w' represents modified wavelet coefficient 310, and thr is a thresholding function 315 that operates on the magnitude of the original wavelet coefficient. Thresholding function 315 may be chosen to vary between zero and one such that original wavelet coefficients within a range 235 about zero (e.g., wavelet coefficients that likely represent noise in an input signal) are modified towards zero whereas original wavelet coefficients outside of range 235 (i.e., in ranges 320) are left unmodified (i.e., multiplied by one). It will be understood that the precise properties of thresholding function 315 can be chosen to determine the size of range 235 and the amount of modification to be applied to wavelet coefficients within range 235.

Figure 3B:
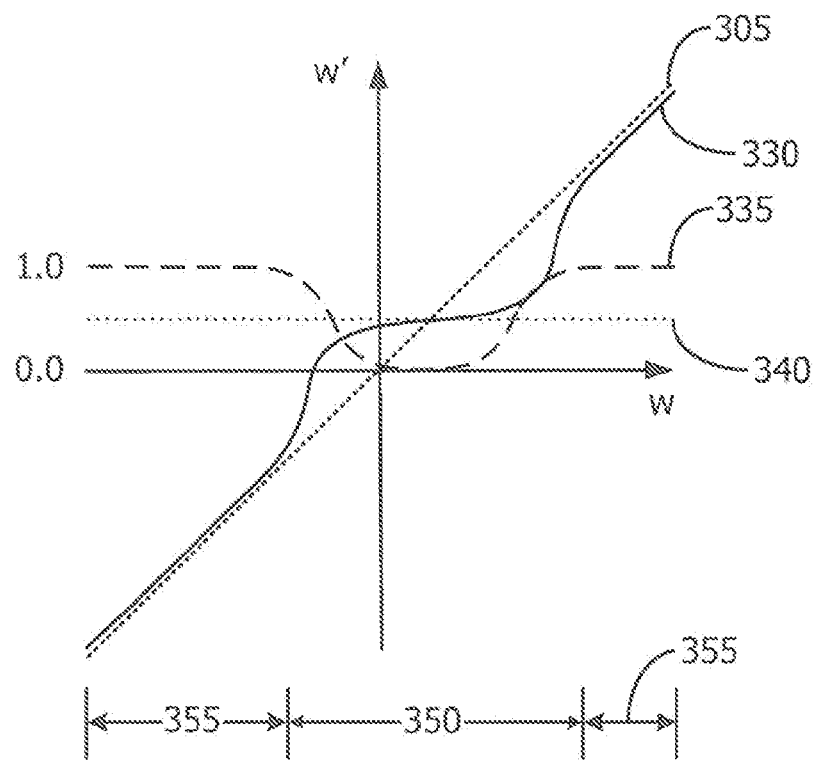

As noted above, although the standard wavelet shrinkage operation illustrated in FIG. 3A effectively reduces signal noise, it can also alter the magnitude relation between wavelet coefficients at different scales and the same spatial location, which results in the production of undesirable artifacts around strong edges. Moreover, known operations to reduce the presence of these artifacts have additional drawbacks. Therefore, in accordance with one embodiment, modification of the wavelet coefficients may be constrained by providing initial estimates of the modified wavelet coefficients towards which the original wavelet coefficients get modified. In one embodiment, these initial estimates may be based on the application of an edge detection filter to an input image. Performance of a wavelet transform on the output of the edge detection filter can be used to generate a wavelet pyramid representation having the initial estimates for the wavelet coefficients for spatial locations corresponding to strong edges and coefficients of zero for other spatial locations in the image. The constrained wavelet shrinkage operation may be defined by:

$$w'=w_e+(w-w_e)*\text{thr}(|w-w_e|), \quad (2)$$

where $w_e$ represents the initial estimate of the modified wavelet coefficient. The initial estimate can in general be very different from the original wavelet coefficient. For example, the original wavelet coefficient may have a different magnitude or even an opposite sign from the initial estimate. As illustrated in FIG. 3B, in accordance with the constrained wavelet shrinkage operation, when the difference between original wavelet coefficient 305 and initial estimate 340 is within range 350 (i.e., the difference between original wavelet coefficient 305 and initial estimate 340 is small), thresholding function 335 operates to modify original wavelet coefficient 305 towards initial estimate 340, and when the difference between original wavelet coefficient 305 and initial estimate 340 is outside of range 350 (i.e., in ranges 355), original wavelet coefficient 305 is left unmodified (i.e., multiplied by one). Therefore, for regions of an image in which an edge detection filter detects the presence of an edge and therefore results in a non-zero initial estimate of the modified wavelet coefficient, modified wavelet coefficient 330 is modified towards initial estimate 340. By providing an initial estimate of the modified wavelet coefficient around strong edges in an image, the constrained wavelet shrinkage operation operates to reduce noise while substantially reducing or eliminating the presence of undesirable artifacts around edges in an output image.

The process flow diagram of FIG. 4A illustrates the complete algorithm for performing noise reduction in accordance with one embodiment of constrained wavelet shrinkage operation 400A. Input image 405 may be initially processed by applying edge detection filter 410 to input image 405. As is known by those of ordinary skill in the art, many different types of edge detection filters exist to identify spatial locations within input image 405 at which image brightness changes or discontinuities indicate a high probability of the presence of an edge. Edge image 415 represents an image having preserved values (e.g., brightness values) at spatial locations corresponding to identified edges within input image 405 and being flattened (e.g., having brightness values tending toward zero) at spatial locations that do not correspond to identified edges.

Wavelet transform 420 may be applied to each of images 405 and 415 to generate wavelet representation 440 (w) of input image 405 and wavelet representation 445 ($w_e$) of edge image 415. As will be known by those of ordinary skill in the art, wavelet representations 440 and 445 may be hierarchical representations (e.g., wavelet pyramids) where each scale of the hierarchical representations may include multiple sets of wavelet coefficients. For example, a single scale of a wavelet representation may include a first set of wavelet coefficients resulting from application of a wavelet low-pass filter in the horizontal direction and a wavelet high-pass filter in the vertical direction, a second set of wavelet coefficients resulting from application of the wavelet high-pass filter in the horizontal direction and the wavelet low-pass filter in the vertical direction, and a third set of wavelet coefficients resulting from application of the wavelet high-pass filter in both the horizontal and vertical directions. Regardless of the precise form, wavelet representations 440 and 445 have corresponding elements resulting from application of wavelet transform 420 to images 405 and 415, respectively. Constrained wavelet shrinkage operation 425 (e.g., the operation described by equation (2)), may then be applied to corresponding elements of wavelet representations 440 and 445 to generate modified wavelet representation 450 (w'). Inverse wavelet transform operation 430 may then be applied to modified wavelet representation 450 to generate output image 435, which, as described above, represents a reduced noise version of input image 405 having preserved image edges.

In the implementation illustrated in FIG. 4A, two forward wavelet transform operations are required. That is, forward wavelet transform 420 must be performed on each of images 405 and 415. However, due to the linear nature of the wavelet transform, the constrained wavelet shrinkage operation can be optimized by performing the subtraction of the estimate from the original image in the spatial domain rather than in the wavelet domain. The process flow diagram of FIG. 4B illustrates a complete algorithm for performing noise reduction in accordance with one embodiment of optimized constrained wavelet shrinkage operation 400B.

As with constrained wavelet shrinkage operation 400A, edge detection filter 410 may be applied to input image 405 to generate edge image 415 ($s_e$). The difference between input image 405 and edge image 415 (s-s$_e$ operation 455) may then be performed in the spatial domain rather than in the wavelet domain. Difference operation 455 may represent a pixel by pixel difference operation performed on images 405 and 415 to generate difference image 460. Wavelet transform 420 may then be applied to difference image 460 to generate wavelet representation 465 (w). Optimized constrained wavelet shrinkage operation 470 may then be performed on wavelet representation 465 to generate modified wavelet representation 475 (w'). Optimized constrained wavelet shrinkage operation 470 may be defined by:

$$w'=w*(1-\text{thr}(|w|)), \quad (3)$$

where w and w' (i.e., wavelet representations 465 and 475) are respectively the original and modified wavelet representations of difference image 460. It should be noted that wavelet representation 465 (labeled w) and wavelet representation 475 (labeled w') are different from wavelet representation 440 (also labeled w) and wavelet representation 450 (also labeled w') in that the former represent the original and modified wavelet representations of difference image 460. Inverse wavelet transform operation 480 may then be performed on wavelet representation 475 to generate modified image 485, which represents a noise-reduced version of difference image 460. Modified image 485 may then be combined with (e.g., subtracted from) input image 405 to generate output image 435.

In another embodiment, the constrained wavelet shrinkage operation can be used to modify the bivariate wavelet shrinkage operation. The standard bivariate wavelet shrinkage operation may be described by:

$$w'=w*\text{thr}(|w|,|w_p|), \quad (4)$$

where w is the original wavelet coefficient, w' is the modified wavelet coefficient, |w| is the magnitude of the original wavelet coefficient, |w$_p$| is the magnitude of the parent of the original wavelet coefficient, and thr is a bivariate threshold function that operates on |w| and |w$_p$|. The parent of a wavelet coefficient may be defined as the corresponding wavelet coefficient from one scale above the wavelet coefficient in the hierarchical wavelet representation.

Application of a constrained wavelet shrinkage operation to the standard bivariate wavelet shrinkage operation results in a constrained bivariate wavelet shrinkage function described by:

$$w'=w_e+(w-w_e)*\text{thr}(|w-w_e|,|w_p-w_{pe}|), \quad (5)$$

where w$_e$ is an initial estimate for a current adjusted wavelet coefficient and w$_{pe}$ is an initial estimate for the adjusted parent of the current wavelet coefficient.

Referring to FIG. 5A, the process flow diagram for constrained bivariate wavelet shrinkage operation 500A in accordance with one embodiment is analogous to the process flow diagram for constrained wavelet shrinkage operation 400A. Constrained bivariate wavelet shrinkage operation 500A proceeds in the same manner as constrained wavelet shrinkage operation 400A through calculation of wavelet representations 440 and 445 of input image 405 and edge image 415 respectively. Constrained bivariate wavelet shrinkage operation 525, however, can operate not only on the differences between corresponding elements of wavelet representations 440 and 445 but also on differences between parent elements of those elements as indicated in Equation (5). Output wavelet representation 550 of constrained bivariate wavelet shrinkage operation 525 may be processed via inverse wavelet transform 430 to generate output image 535.

In a similar manner to constrained wavelet shrinkage operation 400A, constrained bivariate wavelet shrinkage operation 500A can be optimized by combining the initial estimate and original image in the spatial domain rather than in the wavelet domain. The process flow diagram for one embodiment of optimized constrained bivariate wavelet operation 500B is illustrated in FIG. 5B. Optimized constrained bivariate wavelet shrinkage operation 500B proceeds in the same manner as the optimized constrained wavelet shrinkage operation 400B through calculation of wavelet representation 465 of difference image 460. Optimized constrained bivariate wavelet operation 570 may be defined as:

$$w'=w*(1-\text{thr}(|w|,|w_p|)), \quad (6)$$

where w, w', and w$_p$ are respectively the original wavelet coefficient, the modified wavelet coefficient, and the parent of the wavelet coefficient of difference image 460. Just as was the case with respect to optimized constrained wavelet operation 400B, wavelet representations 465 (labeled w, w$_p$) and 575 (labeled w') are different from wavelet representations 440 (also labeled w, w$_p$) and 550 (also labeled w'. Calculation of a wavelet coefficient of modified wavelet representation 575 in accordance with one embodiment of optimized constrained bivariate wavelet operation 570 is a function of both a corresponding wavelet coefficient and a parent of the corresponding wavelet coefficient from wavelet representation 465. Inverse wavelet transform 480 may be applied to modified wavelet representation 575 to generate modified difference image 585, which is a reduced noise version of difference image 460. Modified difference image 585 may then be combined with (e.g., subtracted from) input image 405 to generate output image 535.

As noted above, although the disclosed techniques have generally been described with respect to image processing, the disclosed techniques are equally applicable to input signals other than images by modifying the dimensionality of the edge detection filter and the wavelet transform in accordance with the dimensionality of the input signal. For example, for processing audio signals, the edge detection filter and wavelet transform can operate in one dimension and for processing video signals they can operate in three dimensions. In addition, the specified techniques can be utilized with any invertible linear transform.

Residual Noise Shaping

As noted above, it is common that fine, noise-like texture in an image (such as skin pores, grass, and foliage) is completely masked in the presence of heavy noise such that noise reduction results in the elimination of the desirable fine texture. A straightforward solution to this problem is to reduce the strength of the denoising algorithm (e.g., modify the thresholding function) so that not all of the noise gets removed. However, due to the inherently non-linear nature of denoising algorithms, this tends to produce visual artifacts in the output image. This is especially true for wavelet based denoising algorithms where the wavelet shrinkage thresholding function is particularly non-linear. Another solution is to alpha blend the fully denoised image with the original noisy image to replace some of the removed noise. While this solution produces output images that are free of artifacts, resulting images are often noisy and visually unpleasing.

In accordance with yet another embodiment, a wavelet shrinkage thresholding function can be modified such that the modification of wavelet coefficients is limited to avoid the production of image artifacts. Although the discussion that follows describes the modification of the standard wavelet shrinkage function, it will be understood that the same techniques may be implemented to modify the thresholding function of any of the constrained wavelet shrinkage operations described above.

Figure 6:
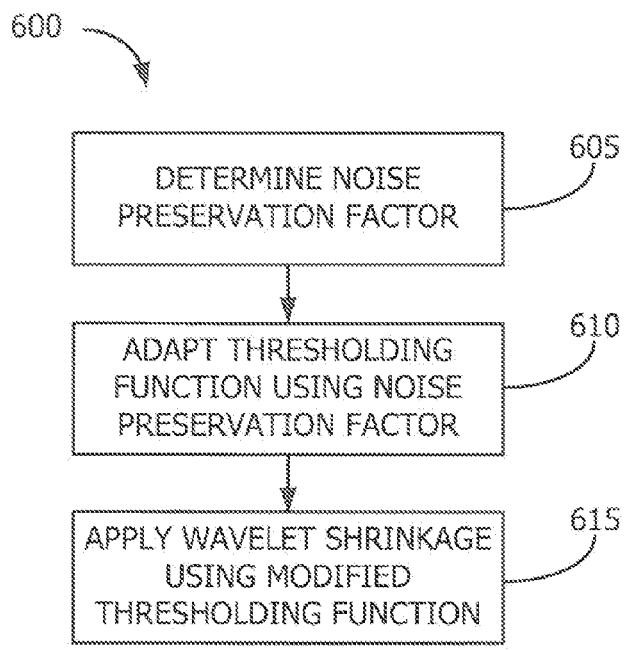
FIG. 6 illustrates a noise shaping operation in accordance with one embodiment.
Figure 7:
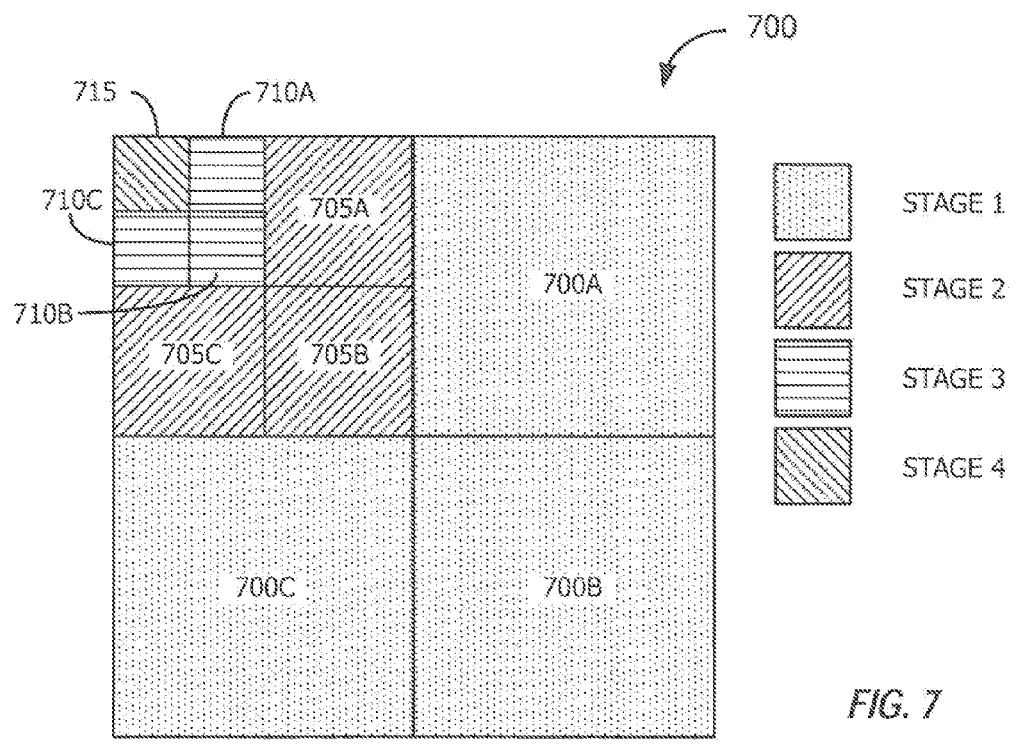
FIG. 7 illustrates a hierarchical transform representation of an input image in accordance with one embodiment.

Referring to FIG. 6, noise shaping operation 600 in accordance with one embodiment may begin with the determination of a noise preservation factor (block 605). It has been determined that a thresholding function can be modified to include a noise preservation factor that is typically a numerical value between zero and one to adjust the amount of modification that is applied to wavelet coefficients in a wavelet representation of an image, thereby adjusting the amount of noise reduction applied to the image. In one embodiment, the noise preservation factor may actually be a set of factors, each of which applies to a particular scale of a hierarchical transform representation of the image. In such an embodiment, the noise preservation factor may be constant for all wavelet coefficients at a given scale but different for each other scale such that it may be possible to adjust the spectrum of the preserved noise in order to achieve a pleasing look in the output image. Referring to FIG. 7, for example, a first noise preservation factor ($c_1$) may be applied to the wavelet coefficients corresponding to stage 1 of wavelet representation 700 (i.e., 700A/B/C), a second noise preservation factor ($c_2$) may be applied to the wavelet coefficients corresponding to stage 2 of wavelet representation 700 (i.e., 705A/B/C), a third noise preservation factor ($c_3$) may be applied to the wavelet coefficients corresponding to stage 3 of wavelet representation 700 (i.e., 710A/B/C), and a fourth noise preservation factor ($c_4$) may be applied to the wavelet coefficients corresponding to stage 4 (e.g., the low-pass residual) of wavelet representation 700 (i.e., 715).

In another embodiment, within each scale, a different noise preservation factor may be applied for each set of wavelet coefficients. As set forth briefly above, each scale of the wavelet representation may include multiple sets of wavelet coefficients. Referring again to FIG. 7, for example, within the first scale, image portion 700A may represent a first set of wavelet coefficients resulting from application of a wavelet low-pass filter in the horizontal direction and a wavelet high-pass filter in the vertical direction, image portion 700B may represent a second set of wavelet coefficients resulting from application of a wavelet high-pass filter in both the horizontal and vertical directions, and image portion 700C may represent a third set of wavelet coefficients resulting from application of a wavelet high-pass filter in the horizontal direction and a wavelet low-pass filter in the vertical direction. Each of scales 2 and 3 may include corresponding sets of wavelet coefficients. Scale 4 may include the residual wavelet coefficients resulting from application of a wavelet low-pass filter in both the horizontal and vertical directions. Within each scale, a different noise preservation factor may be applied to each set of wavelet coefficients. For example, a first noise preservation factor ($c_1$) may be applied to the coefficients representing image portion 700A, a second noise preservation factor ($c_2$) may be applied to the coefficients representing image portion 700B, and a third noise preservation factor ($c_3$) may be applied to the coefficients representing image portion 700C. Accordingly, a different noise preservation factor may be applied for each set of wavelet coefficients (i.e., each subset of coefficients of a particular stage) such that a different amount of noise can be preserved in each direction.

In one embodiment, the value of the noise preservation factor or set of factors may be determined empirically for a given class of images. In another embodiment, the noise preservation factor or set of factors may be computed based on a specific input image. In yet another embodiment, the noise preservation factor or set of factors may be dynamically adjusted by a user to achieve a desirable output image.

After the noise preservation factor or set of factors has been determined, the thresholding function used to modify the wavelet coefficients may be adapted in accordance with the noise preservation factor. The standard wavelet shrinkage formula is set forth above as Equation (1). The thresholding function of Equation (1) can be replaced with the adapted thresholding function set forth below to include the noise preservation factor:

$$thr2(|w|, c) = \begin{cases} c + thr(|w|), & c + thr(|w|) < 1 \\ 1, & c + thr(|w|) \geq 1 \end{cases} \quad (7)$$

where c is the noise preservation factor applied to a given wavelet coefficient w having a magnitude |w|. The adapted standard wavelet shrinkage operation may then be given by:

$$w' = w \cdot thr2(|w|, c), \quad (8)$$

The wavelet shrinkage operation can be applied using the modified thresholding function (block 615). It will be recognized that more noise is preserved as the noise preservation factor increases from zero to one. For a noise preservation factor value of zero, the original thresholding function (thr) controls and the wavelet coefficients are modified accordingly. For a noise preservation factor value of one, no modification of the wavelet coefficient is performed and therefore all noise is preserved. Although noise shaping using an adapted thresholding function has been described in terms of the standard wavelet shrinkage operation, it will be recognized that the same techniques may be applied to adapt the thresholding functions applied in any of the constrained wavelet shrinkage operations described above.

Gradient Based Image Processing with Constrained Integration in the Wavelet Domain Noise reduction operations in accordance with this disclosure have heretofore been described in terms of operations directly on signal values (e.g., image pixel brightness values). As is known by those of ordinary skill in the art, it is often desirable to perform image processing operations by modifying image gradients rather than pixel values. Such operations may include cloning, in-painting, contrast enhancement, tone mapping, stitching, gray scale conversion, recoloring, noise reduction, and manipulation of 3D meshes. After the desired operations are performed via modification of the image gradients, the output result may be reconstructed by integration. However, the integration of two-dimensional gradients is not a trivial operation. The most commonly used method to integrate two-dimensional gradients is to approximate the solution in a least squares sense by solving a two-dimensional Poisson differential equation. While the result is generally of good quality, the numerical implementation requires a computationally expensive iterative convergence algorithm.

Figure 8:
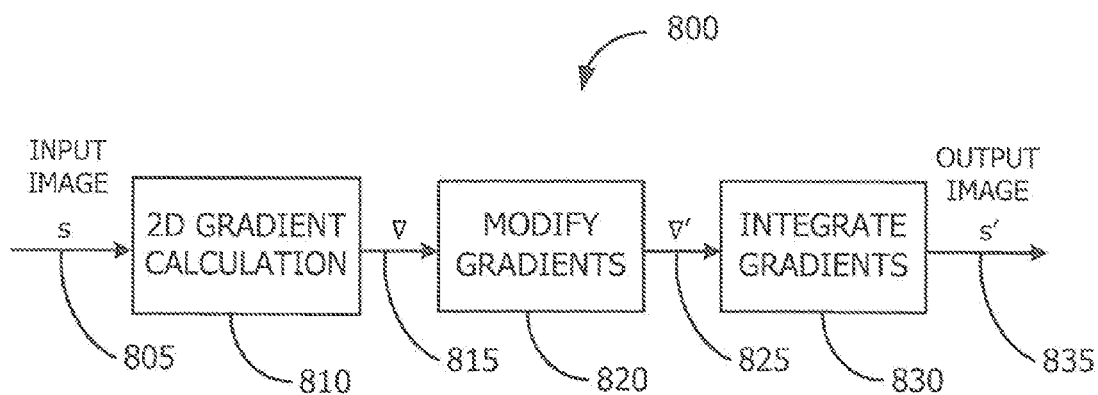
FIG. 8 illustrates a standard gradient-based image processing operation in accordance with one embodiment.

The process flow diagram illustrated in FIG. 8 depicts a general method for performing image processing by modifying image gradient values. As illustrated, gradient based image processing operation 800 may be initiated with the calculation of two-dimensional (2D) gradient 815 of input image 805 by performing 2D gradient calculation operation 810. Gradient 815 may then be modified in accordance with the desired processing operation in modification operation 820 to produce modified gradient 825. Modified gradient 825 may then be integrated in integration operation 830 to produce output image 835. As set forth above, integration operation 830 typically involves a computationally expensive iterative convergence algorithm.

Figure 9A:
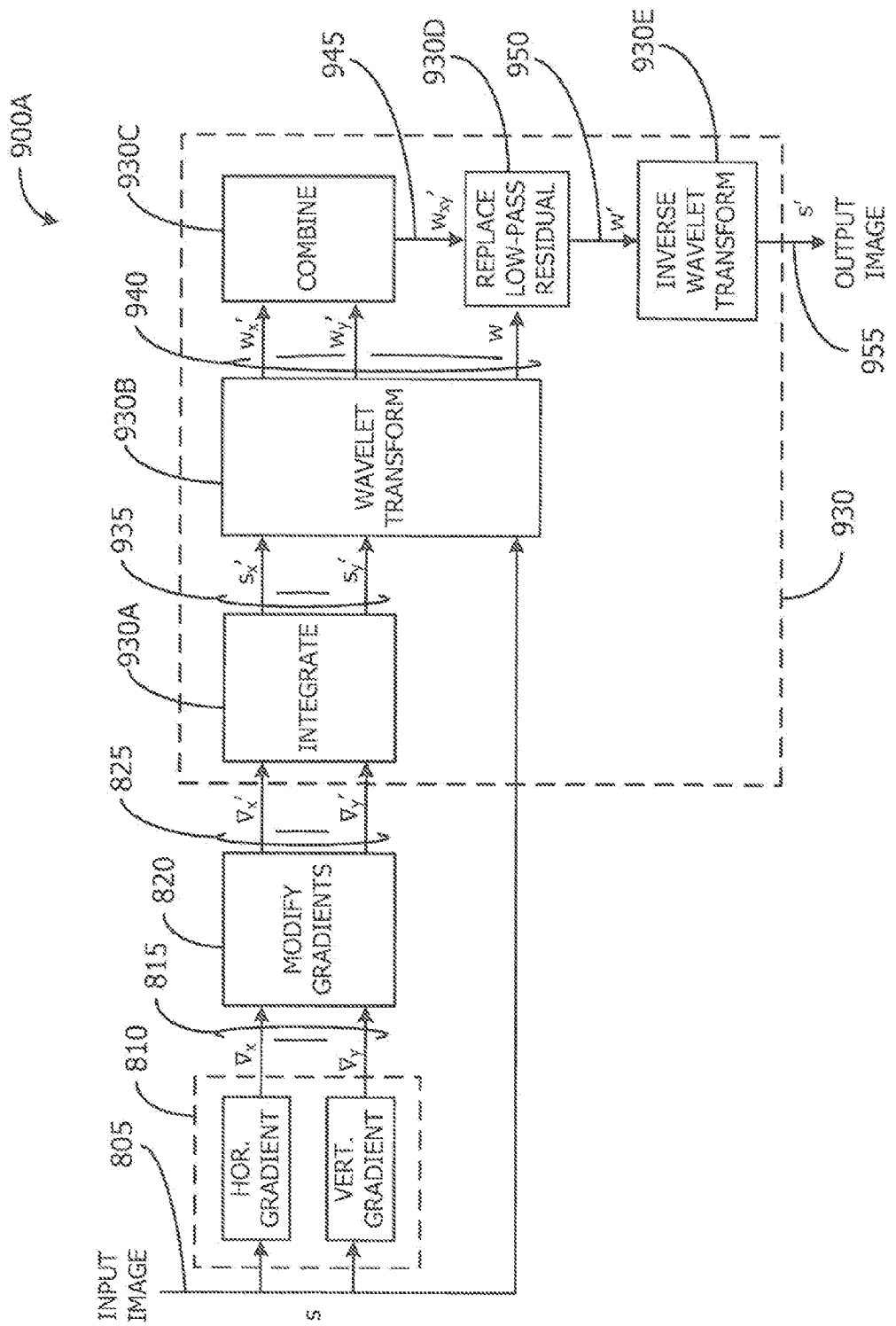
Figure 8B:
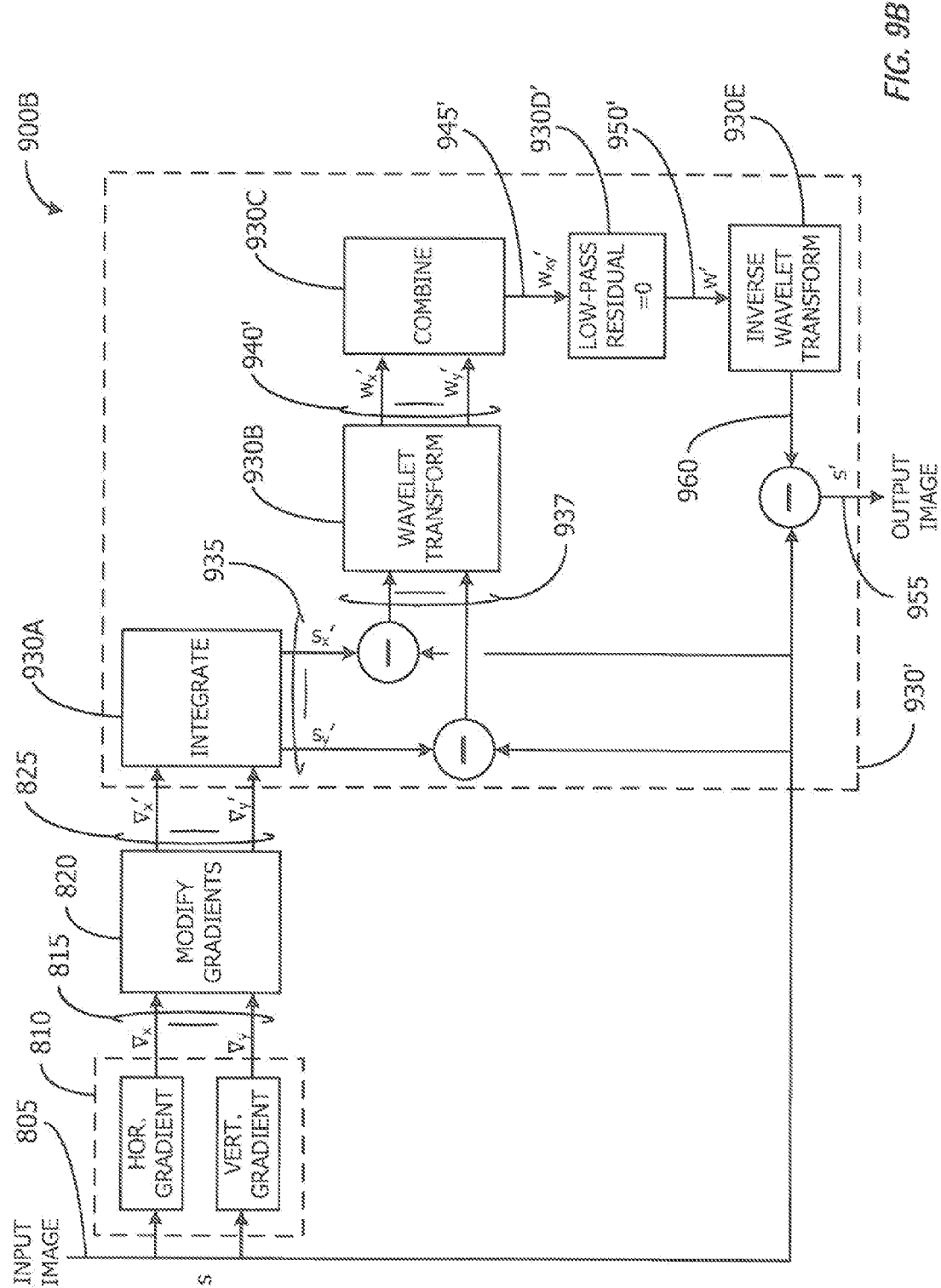

Referring now to FIG. 9A, in accordance with one embodiment, it has been determined that the computational complexity of integration operation 830 may be reduced by summing gradients separately in the horizontal and vertical directions and combining the result in the wavelet domain while applying a low-pass constraint. Like operation 800, gradient based image processing operation 900A may be initiated by performing gradient calculation operation 810 on input image 805. A 2D gradient may then be defined in continuous form as the combination of partial derivatives along the horizontal and vertical directions:

$$\nabla = x_0 \frac{\partial s}{\partial x} + y_0 \frac{\partial s}{\partial y} \quad (9)$$

where s is input image 805, $x_0$ is the unit vector in the horizontal direction and $y_0$ is the unit vector in the vertical direction. Because digital images are discrete and consist of separate pixels, the discrete gradient can be calculated as a finite difference. There are two common methods for calculating a discrete 2D gradient. The first common method defines the discrete gradient as:

$$\nabla_x = s(x+1,y) - s(x-1,y),$$

$$\nabla_y = s(x,y+1) - s(x,y-1). \quad (10)$$

Figure 10:
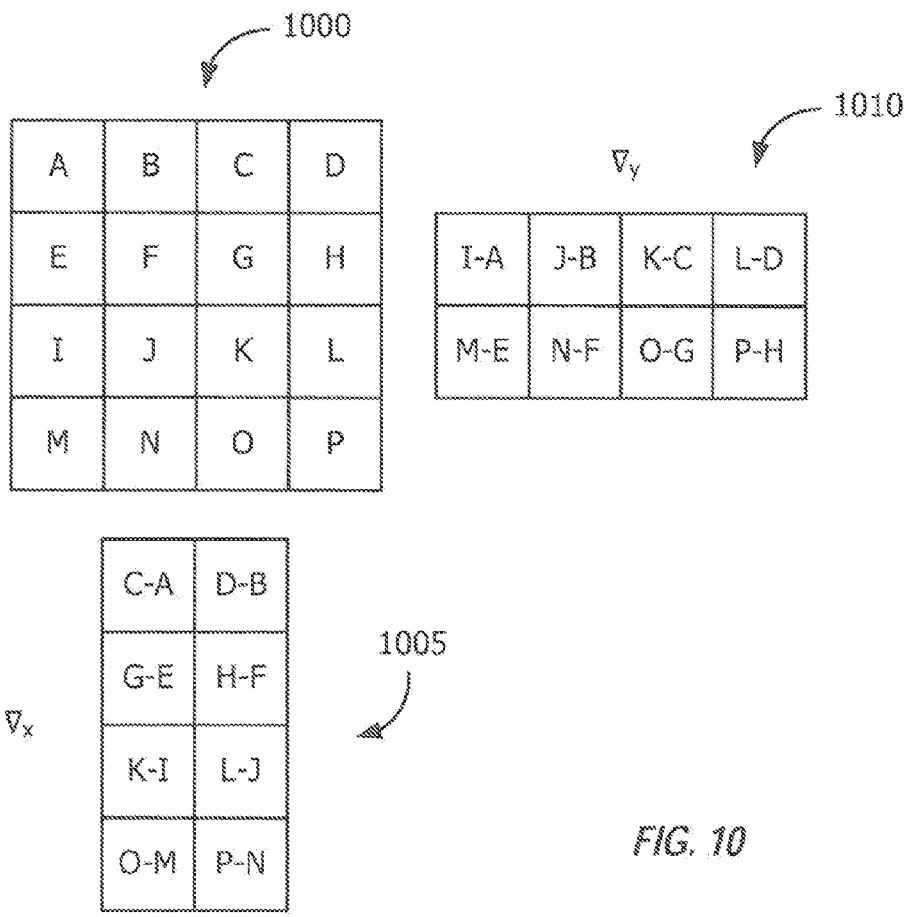

The first gradient calculation method is illustrated in FIG. 10, where image portion 1000 represents a sample 4×4 pixel array of an input image having pixel values represented by the reference characters within the pixel boundaries. As illustrated, the gradients in both x (1005) and y (1010) are defined over the same grid as image portion 1000.

The second common method for calculating a discrete 2D gradient defines the discrete gradient as:

$$\nabla_x = \frac{s(x,y) + s(x,y-1)}{2} - \frac{s(x-1,y) + s(x-1,y-1)}{2}, \quad (11)$$

$$\nabla_y = \frac{s(x,y) + s(x-1,y)}{2} - \frac{s(x,y-1) + s(x-1,y-1)}{2}.$$

Figure 11:
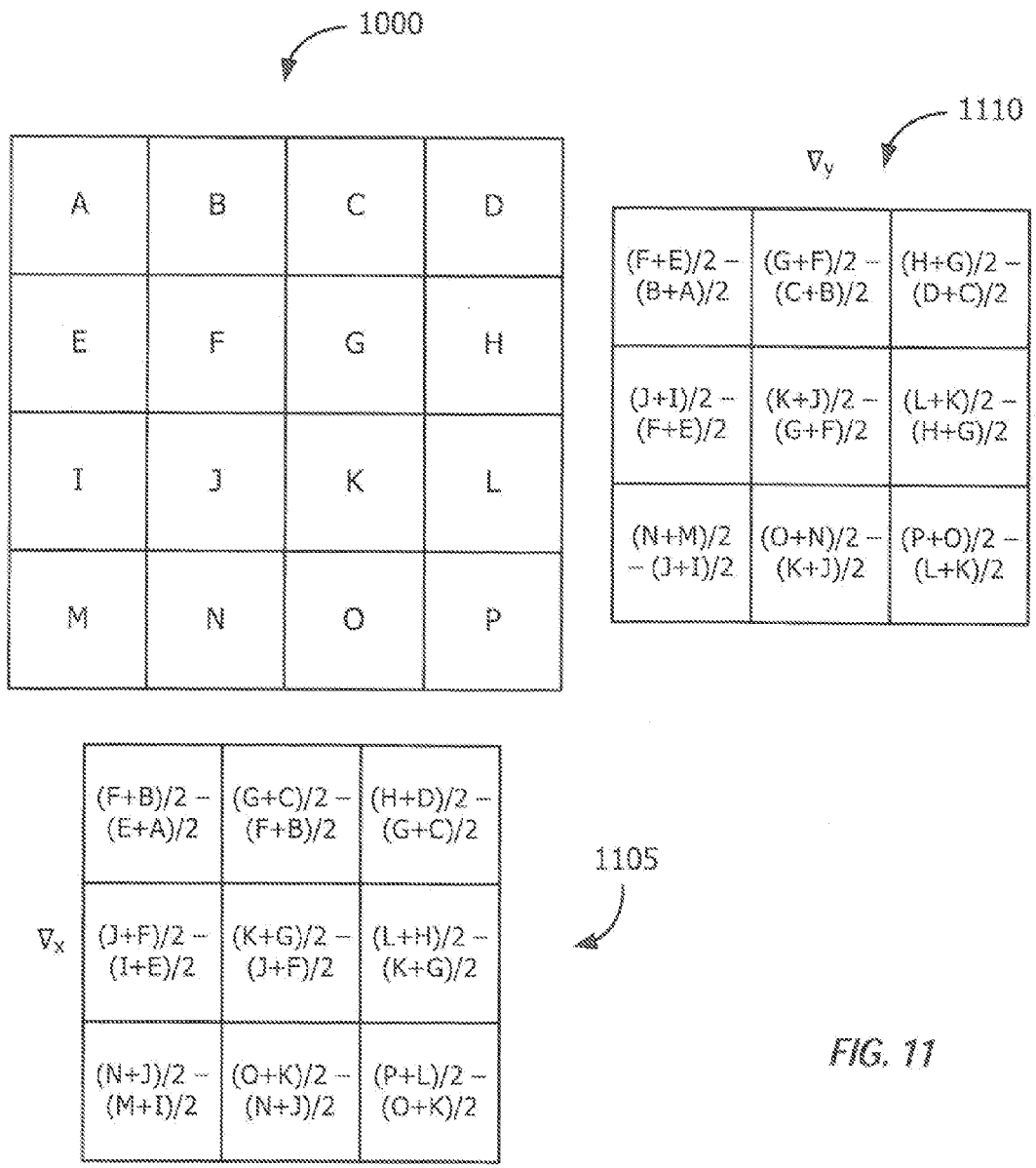

The second gradient calculation method is illustrated in FIG. 11. As illustrated, the gradients in both x (1105) and y (1110) are positioned between the image pixels of image portion 1000. Both of the described gradient calculation methods can be regarded as derived from a simple discrete gradient separately defined in x and y as:

$$\nabla_x = s(x,y) - s(x-1,y),$$

$$\nabla_y = s(x,y) - s(x,y-1). \quad (12)$$

The 2D gradient in Equation (12) (illustrated in FIG. 12) may be defined separately in x (1205) and y (1210) because the samples of $\nabla_x$ and $\nabla_y$ are not positioned over the same grid. Referring back to FIG. 9A, gradient calculation operation 810 produces 2D gradient 815 that includes horizontal gradient map ($\nabla_x$) and vertical gradient map ($\nabla_y$).

Gradient modification operation 820 may then be performed separately on the horizontal and vertical gradient maps to produce modified horizontal gradient map ($\nabla_x'$) and modified vertical gradient map ($\nabla_y'$). Although modification operation 820 is performed separately for horizontal gradient map ($\nabla_x$) and vertical gradient map ($\nabla_y$), each modification can be defined as a function of both horizontal gradient map ($\nabla_x$) and vertical gradient map ($\nabla_y$) in accordance with Equation (12) as:

$$\nabla_x' = f_x(\nabla_x, \nabla_y),$$

$$\nabla_y' = f_y(\nabla_x, \nabla_y), \quad (10)$$

where $\nabla_x$ and $\nabla_y$ can be defined in the sense of Equations (10), (11), or (12) but $\nabla_x'$ and $\nabla_y'$ are defined strictly in the sense of Equation (12). As will be understood by those of ordinary skill in the art, the gradient modification functions can be defined in terms of the desired image processing operation (e.g., cloning, in-painting, contrast enhancement, tone mapping, stitching, gray scale conversion, recoloring, noise reduction, etc.).

Operation 900A replaces computationally expensive iterative integration operation 830 with integration operation 930. Integration operation 930 may begin with simple integration operation 930A which sums modified gradients 825 separately in the horizontal and vertical directions to generate two outputs 935 defined as:

$$s_x' = s_x'(x-1,y) + \nabla_x'(x,y),$$

$$s_y' = s_y'(x,y-1) + \nabla_y'(x,y). \quad (14)$$

where $s_x'$ is the result of integration of modified horizontal gradient ($\nabla_x'$) and $s_y'$ is the result of integration of modified vertical gradient ($\nabla_y'$). FIG. 13 illustrates the outputs ($s_x'$ and $s_y'$) of integration operation 930A with respect to example image portion 1000, where the modified gradients are expressed as modified versions of the gradients illustrated in FIG. 12. In order to obtain a single output image, outputs 935 must be combined. Combining outputs 935 begins with the calculation of wavelet representations 940 of outputs 935 and input image 805 by applying wavelet transform operation 930B. As set forth above, application of a wavelet transform to an input image (such as outputs 935) decomposes the input image into a hierarchical representation of different scales from fine to coarse. At each scale, the wavelet representation may consist of three sets of wavelet coefficients denoted LH, HL, and HH. The coefficient set denoted LH may be produced by applying the low-pass filter of wavelet transform 930B in the horizontal direction and the high-pass filter of wavelet transform 930B in the vertical direction. The coefficient set denoted HL may be produced by applying the high-pass filter of wavelet transform 930B in the horizontal direction and the low-pass filter of wavelet transform 930B in the vertical direction. The coefficient set denoted HH may be produced by applying the high-pass filter of wavelet transform 930B in both the horizontal and vertical directions. At the top of the wavelet pyramid representation is a set of wavelet coefficients denoted LL, which may be produced by applying the low-pass filter of wavelet transform 930B in both the horizontal and vertical directions at the coarsest scale (i.e., the low-pass residual).

As illustrated in FIG. 9A, wavelet transform operation 930B is applied to $s_x'$, $s_y'$, and input image 805 to generate horizontal wavelet representation ($w_x'$), vertical wavelet representation ($w_y'$), and input image wavelet representation (w).

Figure 14:
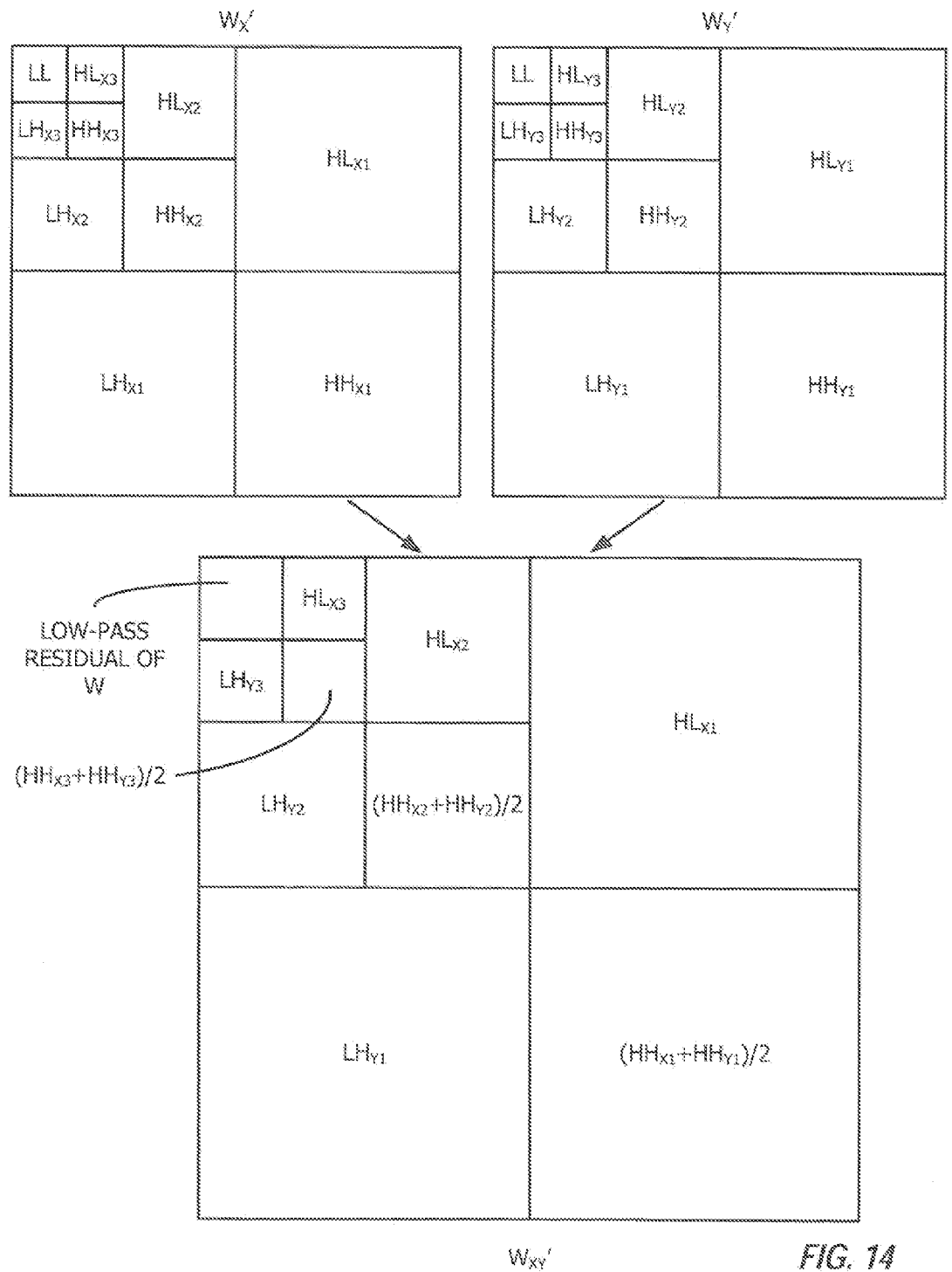
FIG. 14 illustrates the combination of wavelet representations in accordance with one embodiment.

Horizontal wavelet representation ($w_x'$) and vertical wavelet representation ($w_y'$) can then be combined at combination operation 930C. It should be noted that wavelet transform 930B should be separable in order to combine horizontal wavelet representation ($w_x'$) and vertical wavelet representation ($w_y'$) in combination operation 930C. Combination operation 930C and low-pass residual operation 930D are illustrated in FIG. 14. Combination of horizontal wavelet representation ($w_x'$) and vertical wavelet representation ($w_y'$) to produce combined wavelet representation 945 ($w_{xy}'$) may be performed scale-by-scale as follows:

$$LH_{xy}' = LH_y' \quad (15)$$

$$HL_{xy}' = HL_x' \quad (16)$$

$$HH_{xy}' = \frac{HH_x' + HH_y'}{2}, \quad (17)$$

where $LH_y'$ and $HH_y'$ are coefficient sets of vertical wavelet representation ($w_y'$) and $LH_x'$ and $HH_x'$ are coefficient sets of horizontal wavelet representation ($w_x'$). Referring again to FIG. 9A, to constrain the output, the low-pass residual (LL) of combined wavelet representation 945 ($w_{xy}'$) may be set equal to the low-pass residual coefficients (LL) of the wavelet representation of input image 805 (w) at low-pass residual operation 930D to generate modified wavelet representation 950 (w'). Although operation 900A illustrates use of the low-pass residual (LL) of the wavelet representation of input image 805 as the low-pass constraint, in an alternate embodiment, other sources of the low-pass constraint may be utilized. Output image 955 may be produced from modified wavelet representation 950 (w') via inverse wavelet transform operation 930E.

Like the constrained wavelet shrinkage operations described above, gradient based image processing operation 900A can be optimized as illustrated in FIG. 9B to eliminate the need to calculate the forward wavelet transform of input image 805. Optimized gradient based image processing operation 900B proceeds in the same manner as operation 900A through simple integration operation 930A. Rather than calculating the wavelet transform of outputs 935 ($s_x'$ and $s_y'$), however, outputs 935 may be separately combined with (e.g., subtracted from) input image 805 to generate difference outputs 937 (still defined separately as a horizontal difference output and a vertical difference output). The horizontal and vertical wavelet representations 940' ($w_x'$ and $w_y'$) of difference outputs 937 may then be calculated in wavelet transform operation 930B and combined in the same manner as set forth above with respect to operation 900A in combine operation 930C to generate combined wavelet representation 945' ($w_{xy}'$). The low-pass residual of combined wavelet representation 945' ($w_{xy}'$) may then be set to zero to generate modified difference wavelet representation 950' (w'). Stated differently, the coefficients of coefficient set LL of modified difference wavelet representation 950' (w') may all be set to zero. It should be noted that this step differs from low-pass residual operation 930D. Through inverse wavelet transform operation 930E, modified difference wavelet representation 950' (w') is converted to modified difference image 960, which can be subtracted from input image 805 to generate output image 955.

Gradient based image processing operations 900A and 900B provide the advantage of significantly reducing the computational complexity of the required integration operation of gradient based image processing. It has been found that the computational complexity of operations 900A and 900B is nearly linearly dependent on the number of input pixels due to the multi-scale pyramidal nature of the wavelet transform. In addition, the disclosed operations can be combined with other operations that require a wavelet transform, in which case the gradient integration is essentially free computationally. The disclosed operations can additionally operate on gradients having any dimensionality provided that the gradient can be computed separately for each dimension and the linear transform is separable for each dimension. In an alternate embodiment, the disclosed gradient based image processing operations can employ any linear separable transform, such as, for example, the dual tree complex wavelet transform, the curvelet transform, or a mixture of different transforms at different scales of the decomposition pyramid in lieu of the standard digital wavelet transform.

Figure 15:
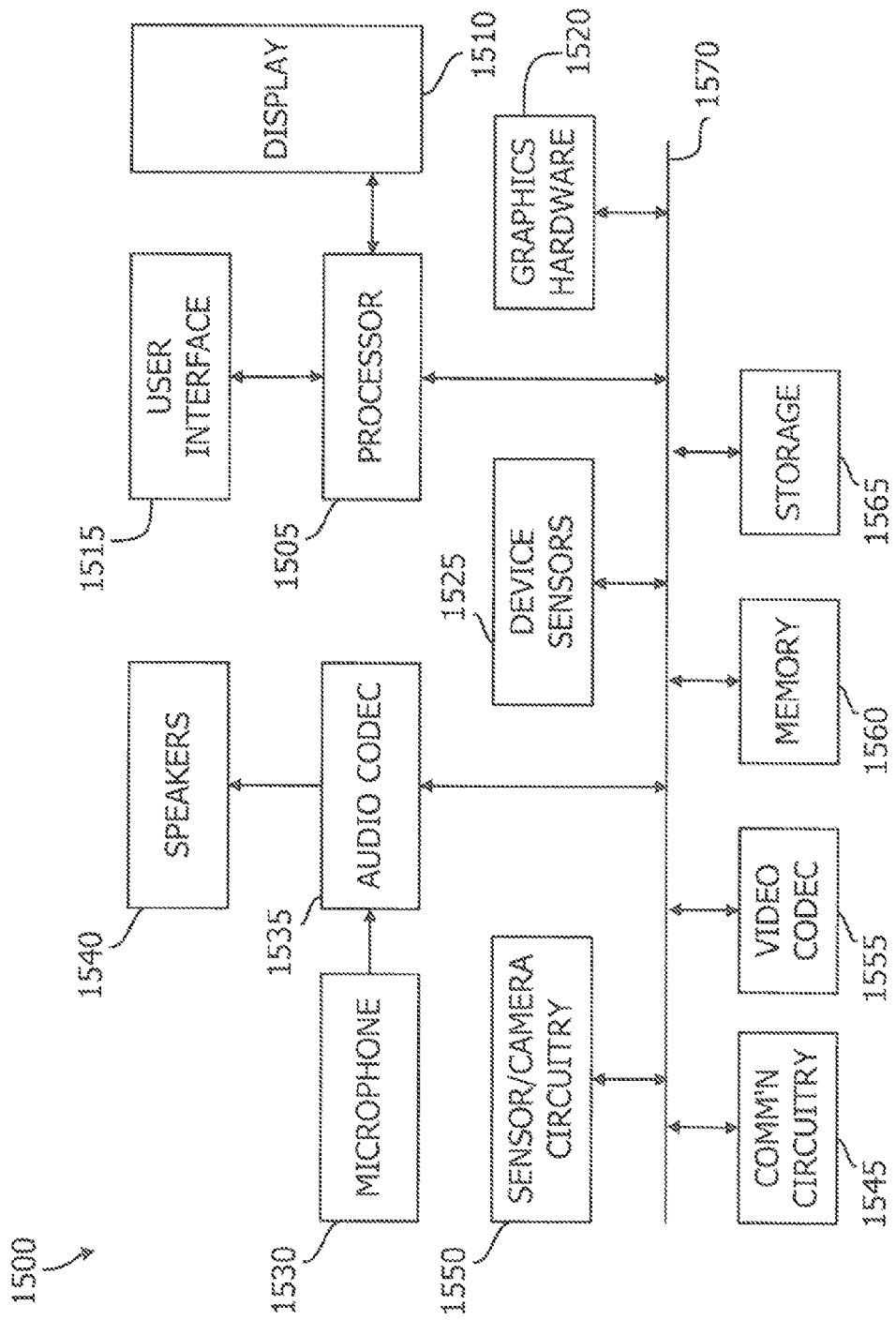
FIG. 15 shows an illustrative electronic device in accordance with one embodiment.

Referring to FIG. 15, a simplified functional block diagram of illustrative electronic device 1500 is shown according to one embodiment. Electronic device 1500 may include processor 1505, display 1510, user interface 1515, graphics hardware 1520, device sensors 1525 (e.g., proximity sensor/ambient light sensor, accelerometer and/or gyroscope), microphone 1530, audio codec(s) 1535, speaker(s) 1540, communications circuitry 1545, digital image capture unit 1550, video codec(s) 1555, memory 1560, storage 1565, and communications bus 1570. Electronic device 1500 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 1500.

Processor 1505 may execute instructions necessary to carry out or control the operation of many functions performed by device 1500. Processor 1505 may, for instance, drive display 1510 and receive user input from user interface 1515. User interface 1515 can take a variety of forms, such as a button, keypad, dial, a click wheel, keyboard, display screen and/or a touch screen. Processor 1505 may also, for example, be a system-on-chip such as those found in mobile devices and include a dedicated graphics processing unit (GPU). Processor 1505 may be based on reduced instruction-set computer (RISC) or complex instruction-set computer (CISC) architectures or any other suitable architecture and may include one or more processing cores. Graphics hardware 1520 may be special purpose computational hardware for processing graphics and/or assisting processor 1505 to process graphics information. In one embodiment, graphics hardware 1520 may include a programmable graphics processing unit (GPU).

Sensor and camera circuitry 1550 may capture still and video images that may be processed, at least in part, in accordance with the disclosed techniques by video codec(s) 1555 and/or processor 1505 and/or graphics hardware 1520, and/or a dedicated image processing unit incorporated within circuitry 1550. Images so captured may be stored in memory 1560 and/or storage 1565. Memory 1560 may include one or more different types of media used by processor 1505 and graphics hardware 1520 to perform device functions. For example, memory 1560 may include memory cache, read-only memory (ROM), and/or random access memory (RAM). Storage 1565 may store media (e.g., audio, image and video files), computer program instructions or software, preference information, device profile information, and any other suitable data. Storage 1565 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1560 and storage 1565 may be used to tangibly retain computer program instructions or code organized into one or more modules and written in any desired computer programming language. When executed by, for example, processor 1505 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause one or more processors to:
    apply an integrator function to a set of gradient signals to obtain a set of integrated signals;
    separately combine an input signal with each of the set of integrated signals to generate difference output signals;
    apply an invertible linear transform to each of the difference output signals to obtain a transform representation of the difference output signals; and
    adjust one or more components of the transform representation of the difference output signals based, at least in part, on an initial estimate of the adjusted one or more components to generate a modified transform representation.

2. The non-transitory program storage device of claim 1, wherein the instructions to cause the one or more processors to adjust one or more components of the transform representation of the difference output signals comprise instructions to cause the one or more processors to apply a thresholding function configured to adjust components having values within a component value range towards the initial estimate of the one or more adjusted components.

3. The non-transitory program storage device of claim 1, wherein the first input signal is a digital image.

4. The non-transitory program storage device of claim 3, wherein the invertible linear transform is a two-dimensional wavelet transform.

5. The non-transitory program storage device of claim 1, wherein the transform representation of the difference output signals is a hierarchical representation.

6. The non-transitory program storage device of claim 5, wherein the instructions to cause the one or more processors to adjust one or more components of the transform representation of the difference output signals comprise instructions to cause the one or more processors to apply a thresholding function that modifies the one or more components based, at least in part, on an initial estimate of an adjusted value of one or more related components in the hierarchical representation.

7. The non-transitory program storage device of claim 1, further comprising instructions to cause the one or more processors to apply an inverse transform to the modified transform representation to obtain a second an output image signal.

8. The non-transitory program storage device of claim 7, wherein the output image signal has reduced noise relative to the input signal.

9. The device of claim 1, wherein the instructions further comprise instructions stored thereon to cause the one or more processors to:
    apply an inverse linear transform to the modified transform representation to generate a modified difference image signal;
    subtract the modified difference image signal from the input signal to generate an output image signal; and
    store the output image signal in a memory.

10. The device of claim 1, wherein the instructions further comprise instructions stored thereon to cause the one or more processors to separately combine the input signal with each of the set of integrated signals to generate a horizontal difference output signal and a vertical difference output signal.

11. A method, comprising:
    applying, using one or more processors, an integrator function to a set of first signals to obtain a set of integrated signals, the set of first signals being gradient signals;
    separately combining, using the one or more processors, an input image signal with each of the set of integrated signals to generate difference output signals;
    applying, using the one or more processors, an invertible linear transform to each of the difference outputs signals to obtain a transform representation of the difference output signals; and
    adjusting, using the one or more processors, one or more components of the transform representation of the difference output signals based, at least in part, on an initial estimate of the adjusted one or more components to generate a modified transform representation.

12. The method of claim 11, further comprising:
    applying an inverse linear transform to the modified transform representation to generate a modified difference image signal;
    subtracting the modified difference image signal from the input image signal to generate an output image signal; and
    storing the output image signal in a memory.

13. The method of claim 11, further comprising separately combining the input image signal to generate a horizontal difference output signal and a vertical difference output signal.

14. A device, comprising:
    a memory; and
    a processor operatively coupled to the memory and configured to execute program code stored in the memory to:
        apply an integrator function to a set of first signals to obtain a set of integrated signals, the set of first signals being gradient signals;
        separately combine an input image signal with each of the set of integrated signals to generate difference output signals;
        apply an invertible linear transform to each of the difference outputs signals to obtain a transform representation of the difference output signals; and
        adjust one or more components of the transform representation of the difference output signals based, at least in part, on an initial estimate of the adjusted one or more components to generate a modified transform representation.

15. The device of claim 14, wherein the program code to cause the processor to adjust one or more components of the transform representation of the difference output signals comprises program code to cause the processor to apply a thresholding function configured to adjust components having values within a component value range towards the initial estimate of the one or more adjusted components.

16. The device of claim 14, wherein the input signal is a digital image that is based, at least in part, on an image obtained by an image capture unit of the device.

17. The device of claim 14, wherein the invertible linear transform is a two-dimensional wavelet transform.

18. The device of claim 14, wherein the processor comprises program code to:
    apply an inverse linear transform to the modified transform representation to generate a modified difference image signal;
    subtract the modified difference image signal from the input image signal to generate an output image signal; and
    store the output image signal in a memory.

19. The device of claim 14, wherein the processor comprises program code to separately combine the input image signal to generate a horizontal difference output signal and a vertical difference output signal.

* * * * *